(12) United States Patent
Prost et al.

(10) Patent No.: US 10,487,809 B2
(45) Date of Patent: Nov. 26, 2019

(54) SELF-CONTAINED DEVICE FOR STORING AND RELEASING ENERGY IN ORDER TO POWER A PIECE OF ELECTRICAL EQUIPMENT

(71) Applicant: SAFRAN AIRCRAFT ENGINES, Paris (FR)

(72) Inventors: Francois Prost, Moissy-Cramayel (FR); William Bense, Moissy-Cramayel (FR)

(73) Assignee: SAFRAN AIRCRAFTS ENGINES, Paris (FR)

( * ) Notice: Subject to any disclaimer, the term of this patent is extended or adjusted under 35 U.S.C. 154(b) by 0 days.

(21) Appl. No.: 15/746,755

(22) PCT Filed: Jul. 15, 2016

(86) PCT No.: PCT/FR2016/051826
§ 371 (c)(1),
(2) Date: Jan. 22, 2018

(87) PCT Pub. No.: WO2017/013342
PCT Pub. Date: Jan. 26, 2017

(65) Prior Publication Data
US 2018/0363634 A1    Dec. 20, 2018

(30) Foreign Application Priority Data
Jul. 23, 2015 (FR) ..................................... 15 57006

(51) Int. Cl.
*F03G 7/08* (2006.01)
*H02K 7/18* (2006.01)
*F03G 7/04* (2006.01)
*H02K 7/07* (2006.01)
*B64D 41/00* (2006.01)

(52) U.S. Cl.
CPC ............... *F03G 7/08* (2013.01); *B64D 41/00* (2013.01); *F03G 7/04* (2013.01); *H02K 7/07* (2013.01); *H02K 7/1853* (2013.01)

(58) Field of Classification Search
CPC .............. F15B 11/06; F15B 2211/8855; F15B 2211/89; F15B 5/006; H02K 7/1853; H02K 7/07; F03G 7/04; F03G 7/08
See application file for complete search history.

(56) References Cited

U.S. PATENT DOCUMENTS 795,761 A    7/1905 Fulton
1,939,776 A    12/1933 Holmes et al.
(Continued)

FOREIGN PATENT DOCUMENTS

DE    102008030676 A1 *    1/2010    ............... F03G 7/04
FR    2795690 A1 *    1/2001    ............. B60P 3/227
WO    2011/158127 A1    12/2011

OTHER PUBLICATIONS

FR 2795690 A1 machine translation to English from espacenet, 2001.*
(Continued)

*Primary Examiner* — Thomas E Lazo
*Assistant Examiner* — Michael Quandt
(74) *Attorney, Agent, or Firm* — Womble Bond Dickinson (US) LLP (57) ABSTRACT

The invention relates to an autonomous device (10) for storing and releasing energy in order to power a piece of electrical equipment (12), in particular a piece of electrical equipment (12) of an aircraft, characterised in that said device comprises:
  a first means (16), configured to transform a variation in the surrounding pressure (P) to which the device (10) is subject into mechanical energy,
  at least one second means (20, 22), configured to mechanically store said mechanical energy by transforming same into the form of mechanical potential energy,
  a third means (24), configured to control the release of the mechanical potential energy contained in said second
(Continued)

means (20, 22) and transform same into restored mechanical energy, a fourth means (28), configured to transform the restored mechanical energy into electrical energy suitable for powering said piece of electrical equipment (12).

15 Claims, 3 Drawing Sheets

(56) References Cited

U.S. PATENT DOCUMENTS

| | | | |
|---|---|---|---|
| 3,352,108 A | 11/1967 | Eddy | |
| 6,804,171 B2 * | 10/2004 | Miyazawa | H02K 7/1853 368/204 |
| 2012/0313575 A1 | 12/2012 | Stansbury, III | |
| 2015/0061375 A1 * | 3/2015 | von Heimendahl | H01M 10/46 307/9.1 |

OTHER PUBLICATIONS

DE 102008030676 A1 machine translation to English from espacenet, 2010.*

International Search Report and Written Opinion received for PCT Patent Application No. PCT/FR2016/051826, dated Sep. 22, 2016, 14 pages (6 pages of English Translation and 8 pages of Original Document).

International Preliminary Report on Patentability received for PCT Patent Application No. PCT/FR2016/051826, dated Feb. 1, 2018, 12 pages (6 pages of English Translation and 6 pages of Original Document).

* cited by examiner

SELF-CONTAINED DEVICE FOR STORING AND RELEASING ENERGY IN ORDER TO POWER A PIECE OF ELECTRICAL EQUIPMENT

The invention relates to a self-contained device for storing and releasing energy for powering electrical equipment.

The invention relates more particularly to a self-contained device for storing and releasing energy for powering electrical equipment, in particular electrical equipment of an aircraft, such as an on-board sensor.

Powering on-board sensors of an aircraft is a genuine issue. Since aircraft are being more and more monitored, this requires sensors at various points of the fuselage of said aircraft or on the engines thereof, such as pressure sensors, temperature sensors, vibration sensors or strain gauges. Said sensors are conventionally connected to one or more control units which are generally arranged at a distance from said sensors, involving routing of cables that may be dedicated to transmitting information, or at least dedicated to supplying electrical power to said sensors across fuselage regions or across engine regions of said aircraft which are not necessarily intended for the passage of such cables. Passing cables through said regions, or designing said regions so as to facilitate the passage of said cables, may be complex. Depending on the regions crossed, passing cables through bulkheads may also impair the overall performance of the aircraft, both due to sealing constraints when passing through bulkheads, and due to constraints regarding maintaining the integrity of said cables.

Moreover, installing such cables in an aircraft increases the overall weight of said aircraft, which is disadvantageous in particular in terms of fuel consumption.

PRIOR ART

In order to overcome these drawbacks, one solution consists in making use of a technology for recovering energy by the sensor itself, which technology is also known as energy harvesting. This technology allows some sensors to harvest energy depending on the different flight phases of the aircraft, and to immediately transform said energy into electrical energy in order to ensure the power supply of said sensors and to allow said sensors to thus be self-contained in terms of energy.

It is thus currently known to harvest electrical energy from vibrational energy or thermal energy. Documents U.S. Pat. Nos. 3,352,108-A, 1,939,776-A and 795,761-A1 describe devices that allow to harvest mechanical energy from a temperature differential. Similarly, US-2012/313575-A1 teaches harvesting energy from oscillations of a motor vehicle suspension.

Harvesting of this kind can be applied in particular in sensors arranged on or in an engine of the aircraft. Said energy is restrictive, however. Thus, vibrational energy for example, which is conventionally harvested by piezoelectric devices, allows to harvest energy around a specific frequency but, as soon as the vibrations deviate from said frequency, it becomes virtually impossible to harvest energy using this technology. In the same way, harvesting thermal energy entails the existence of a constant temperature differential, which is not necessarily present during all the flight phases of the aircraft.

The energy harvested is generally used immediately, for example by being converted into electrical energy, as WO-2011/158.127-A1 teaches.

However, storing the electrical energy harvested in this way is also a difficult issue. Batteries do not withstand high temperatures and extreme temperature variations very well. As a result, they cannot be installed on-board in all regions of the aircraft, for example close to the engines, because they can only be used at low temperatures. Moreover, the weight of said batteries is also disadvantageous in terms of the fuel consumption of the aircraft.

There is therefore a genuine need for a solution that allows to benefit from a self-contained and reliable energy source, and to also store said energy in a reliable manner and in a manner having a reduced on-board weight.

SUMMARY OF THE INVENTION

The invention overcomes the above-mentioned drawbacks by proposing a self-contained device for storing and releasing energy for powering electrical equipment of the type described above, comprising means for harvesting energy produced by the pressure variations to which the aircraft is subjected, and for mechanically storing said energy.

For this purpose, the invention proposes a self-contained device for storing and releasing energy for powering electrical equipment, in particular electrical equipment of the type mentioned above, for an aircraft, characterised in that said device comprises:
  a first means that is designed to transform a variation in the ambient pressure applied to the device into mechanical energy,
  at least one second means that is designed to mechanically store said mechanical energy by transforming it into the form of mechanical potential energy,
  a third means that is designed to trigger the release of the mechanical potential energy contained in said at least one second means by transforming it back into the form of mechanical energy,
  a fourth means that is designed to transform the restored mechanical energy into electrical energy that is suitable for powering said electrical equipment.

According to other features of the invention:
  the first means comprises at least one resiliently returning movable diaphragm that has at least one surface to which a specified pressure is applied, and an opposing surface to which said ambient pressure is applied, said diaphragm being able to move in response to a variation in said ambient pressure in order to produce said mechanical energy by means of the movement of said diaphragm, said first means being an aneroid control for example,
  the at least one second means comprises at least one resilient element that is capable of converting the mechanical energy into potential energy that is stored in said resilient element, and of converting the stored potential energy into restored mechanical energy, and an immobilisation element that is designed to immobilise said resilient element in a configuration in which it conserves said potential energy,
  the third means is designed to free said immobilisation element so as to release said resilient element in response to the pressure in the surroundings of the device exceeding a specified pressure threshold,
  the fourth means comprises a dynamo,
  the immobilisation element comprises a pawl device having at least one toothed sector, in particular a rack or a ratchet wheel, that is fixed to the resilient element for movement therewith, and a pawl that is designed to engage in said toothed sector, opposing any movement of said toothed sector and of the resilient element that corresponds to a release of the potential energy stored in said resilient element, the third means is designed to lift the pawl from the toothed sector in response to the pressure in the surroundings of the device exceeding a specified pressure threshold, the third means comprises at least one movable element that is designed to lift the pawl out of the toothed sector, and a resiliently returning movable diaphragm that is rigidly connected to said lifting element, that has one surface to which a specified pressure is applied, and an opposing surface to which the ambient pressure is applied, and which is able to move, as soon as the pressure in the surroundings of the device exceeds a specified pressure threshold, in order to actuate said lifting element.

The invention also relates to a method for powering electrical equipment depending on the ambient pressure applied to said equipment, said equipment comprising a self-contained device for storing and releasing energy of the type described above, characterised in that said method comprises:

a first step during which a variation in the ambient pressure applied to the device is transformed into mechanical energy that is simultaneously stored in the form of potential energy in the at least one resilient element of the second means, a second step that follows the first step and during which the potential energy is conserved in the at least one resilient element of the second means as long as the ambient pressure does not exceed a specified pressure threshold, a third step during which, as soon as the ambient pressure exceeds said specified pressure threshold, the third means releases the second means such that said second means releases the potential energy which is simultaneously converted into restored mechanical energy and then into electrical energy by the fourth means, and during which step the electrical equipment is powered using the electrical energy.

The invention finally relates to self-contained electrical equipment that is designed to be powered depending on the altitude of said aircraft, which equipment is characterised in that it comprises at least one device of the type described above, the ambient pressure of the aircraft being applied to said device.

The invention will be better understood, and other details, features and advantages of the present invention will become clearer upon reading the following description, given by way of non-limiting example with reference to the accompanying drawings, in which:

In the following description, identical reference numerals designate identical parts or parts having similar functions.

Figure 1:
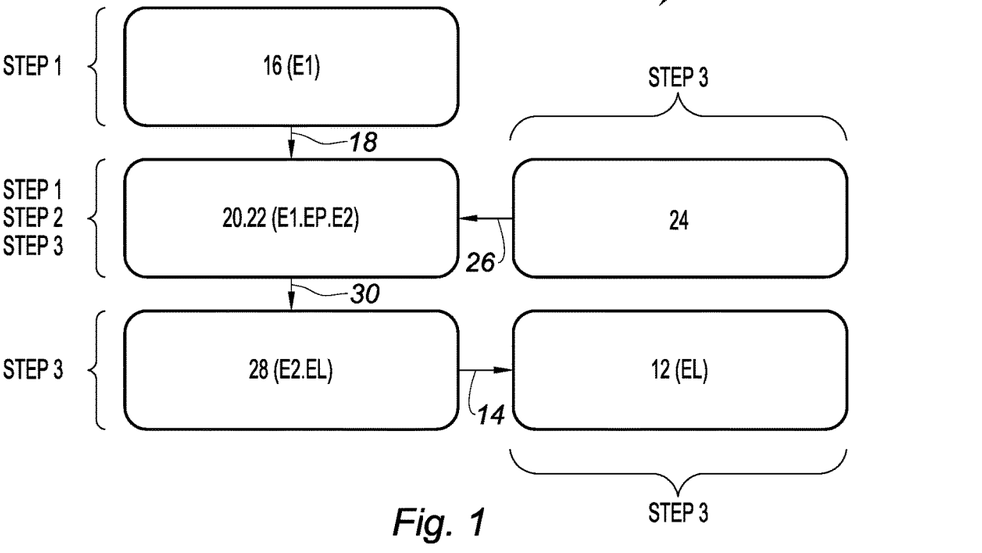
FIG. 1 is a schematic view showing the interactions among the various elements of a device according to the invention.

FIG. 1 shows the elements of a device 10 for storing and releasing energy for powering an electrical equipment, in particular an electrical equipment 12 of an aircraft, produced according to the invention, and the functional interactions among said elements.

The electrical equipment 12 can in particular comprise an on-board sensor such as a pressure sensor, a temperature sensor, a strain gauge or any other sensor that requires a supply of electrical power in order to operate. Without limiting the invention, the electrical equipment could be of a different type and could consist of a signalling device or any other electrical apparatus.

In accordance with the invention, the device 10 is self-contained and allows to supply electrical power to the equipment 12 by means of an electrical connection 14 that is known per se and is preferably also as short as possible, the device 10 moreover being positioned in a location where it is possible to have access to a pressure gradient that is large enough for actuating the device 10.

For this purpose, the device 10 comprises a first means 16 that is designed to transform a variation in the ambient pressure applied to the device 10 into mechanical energy E1. Said first means 16 is connected by a mechanical connection 18 to least one second means 20, 22 that is designed to mechanically store said mechanical energy E1 by transforming it into the form of mechanical potential energy EP. More particularly, the device comprises a second means 20 that is designed to mechanically store said mechanical energy E1 by transforming it into the form of mechanical potential energy EP. The device further comprises a second means 22 that is designed to retain said stored mechanical potential energy EP.

The device 10 also comprises a third means 24 that is designed to control the release of the above-mentioned mechanical potential energy EP in order for said energy to be restored in the form of mechanical energy E2. The third means is designed to act mechanically on the second means 20, 22, for example via a mechanical connection 26.

The device 10 further comprises a fourth means 28 which is designed to transform the restored mechanical energy E2 into electrical energy EL that is suitable for powering said electrical equipment 12. The fourth means 28 is connected to the second means 20, 22 by a mechanical connection 30 and to the electrical equipment 12 via the electrical connection 14.

Figure 6:
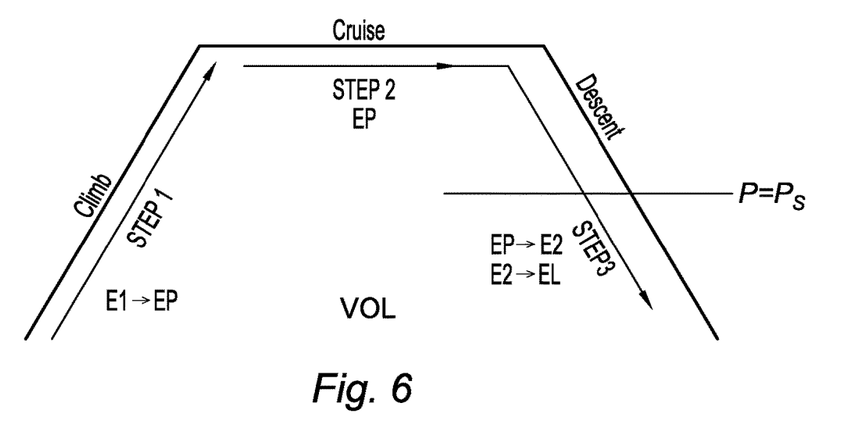
FIG. 6 is a diagram showing a first sequence of the steps of a method for powering electrical equipment using a device according to the invention, used during one complete flight.
Figure 7:
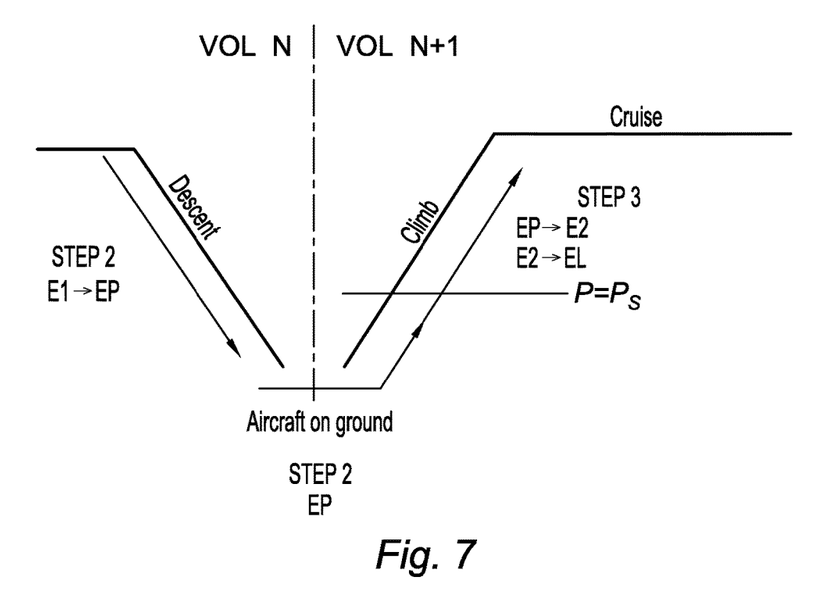
FIG. 7 is a diagram showing a second alternative sequence of the steps of a method for powering electrical equipment using a device according to the invention, used during two successive flights.

The various means of the device 10 are intended to be used in succession during a flight sequence of the aircraft that comprises said device 10. Said sequence is illustrated for example in FIGS. 6 and 7, which each show a variant of the invention. Nevertheless, in each of these variants the various means of the device 10 always operate according to a method of the same type. Said method comprises:

a first step STEP1 during which the mechanical energy E1 is produced and stored in the form of potential energy EP;

a second step STEP2 during which the potential energy EP is conserved and at the end of which said energy is released;

a third step STEP3 during which said potential energy EP is transformed into mechanical energy E2 and during which the mechanical energy E2 is simultaneously transformed into electrical energy EL.

FIG. 1 also shows the implications of each of the various means of the device 10 in these steps.

The first means 16 and the second means 20, 22 are used simultaneously in step STEP1 in order to produce the mechanical energy E1 and to store said energy in the form of potential energy EP.

The second means 20, 22 are also used in the second step, STEP2, during which the potential energy EP is conserved. The third means 24 is used to release the second means 20, 22. The third means 24 is also used to trigger the third step, STEP3, during which the following are each used again:

the second means 20, 22 which transform the potential energy EP back into mechanical energy E2;

the fourth means 28 which simultaneously transforms the mechanical energy E2 into electrical energy EL;

and the electrical equipment 12 that is powered by the fourth means 28.

The various steps STEP1, STEP2, STEP3 are described in greater detail in the remainder of the present description.

The various means 16, 20, 22, 24, 28 of the device 10 are described here.

Figure 2:
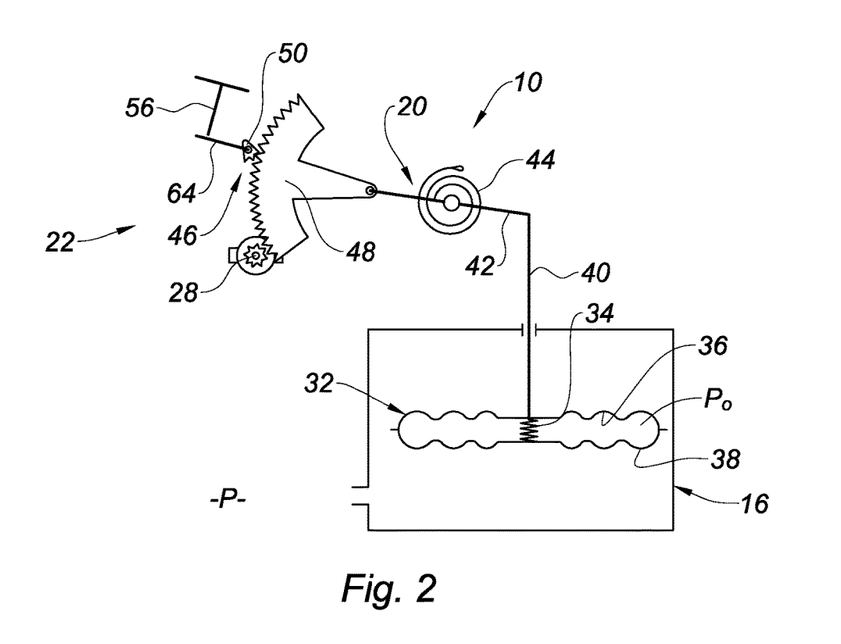
FIG. 2 is a schematic view of the device according to the invention.

In the preferred embodiment of the invention, as shown in FIG. 2, the first means 16 comprises at least one movable diaphragm 32 that returns resiliently under the effect of a resilient means 34 which has at least one surface 36 to which a specified pressure $P_o$ is applied, and an opposing surface 38 to which the ambient pressure P applied to the device 10 is applied. Said movable diaphragm 32 is able to move in response to a variation in said ambient pressure P in order to produce the mechanical energy E1 by means of its movement.

In a manner that does not limit the invention, the first means 16 is an aneroid control 16 for example, comprising two walls or diaphragms 32 that face one another so as to enclose a spring 34 and so as to define an impervious chamber to which the pressure $P_o$ is applied. The two walls 32 can move under the influence of the variation in the pressure P and are capable of actuating a rod 40 that is rigidly connected to one of the walls or diaphragms 32, thus transforming a variation in the pressure P into a movement of the rod 40, which allows mechanical energy E1 to be produced.

Said mechanical energy E1 can be converted into potential energy EP by the second means 20, 22. For this purpose, the second means 20, 22 comprises at least one resilient element 20 that is capable of converting the mechanical energy E1 into potential energy EP that is stored in said resilient element 20, and of converting, in the reverse manner, the stored potential energy EP in order to restore said energy in the form of restored mechanical energy E2. FIG. 2 shows, in a manner that does not limit the invention, a first pivot lever 42 that is coupled to an end of the rod 40.

It will therefore be understood that the rod 40 and the first pivot lever 42 form the mechanical connection 18 between the first means 16 and the second means 20, 22.

In the example shown here, the resilient element 20 comprises a spiral spring 44 which is connected to the rod 40 and which makes it possible to store the energy in the form of potential energy EP and to restore said energy in the form of restored mechanical energy E2. It will be understood that this embodiment does not limit the invention and that the resilient element could comprise a spring of a type different from the spiral spring 44, for example a helical spring, or any other resilient means, such as a pneumatic element, or an element made of an elastomer material, without changing the nature of the invention.

The second means 20, 22 further comprises an immobilisation element 22 which is designed to immobilise said spring 44 of the resilient element 20 in a configuration in which said spring conserves the potential energy EP.

For this purpose, as shown in FIGS. 2 to 4B, the immobilisation element 22 preferably comprises a pawl device 46 having at least one toothed sector 48, in particular a rack or a ratchet wheel, that is fixed to the resilient element 20 for movement therewith, and a pawl 50 that is designed to escape from the toothed sector 48 in a direction of movement of said sector 48, and to engage in said toothed sector 48 in order to oppose any movement of said toothed sector 48 in the opposite direction, and thus any relaxation movement of the spring 44 of the resilient element 20. Indeed, such a movement would correspond to a release of the potential energy EP stored in said resilient element 20 and must be prevented in order to allow to conserve the potential energy EP. FIG. 2 shows, for example, a pivotable toothed sector 48 that is coupled to an end of the first lever 42 and that is able to be immobilised by a pawl 50. The pawl device 46 is shown in FIGS. 3A and 3B.

Figure 3A:
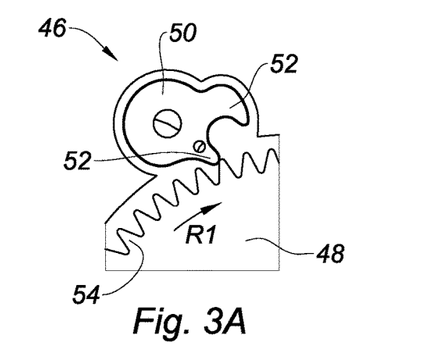
FIGS. 3A and 3B are detailed views of the second means of the device according to the invention in two operating positions.
Figure 3B:
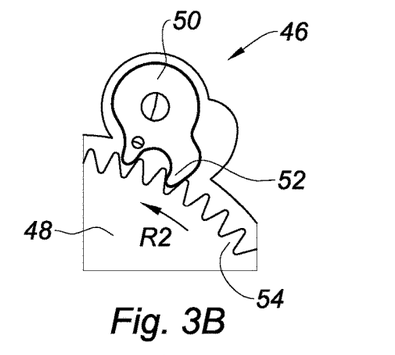

In FIG. 3A, rotating the toothed sector 48 in a first direction R1 allows two teeth 52 of the pawl 50 to leave the teeth 54 of the toothed sector 48, while rotating the toothed sector 48 in a second direction R2 counter to the first direction R1, as shown in FIG. 3B, allows the teeth 52 of the pawl 50 to latch into the teeth 54 of the toothed sector 48. It is therefore possible to allow the first lever 42, described above with reference to FIG. 2, to rotate in a direction that corresponds to tensioning the spring 44 using the pawl device 46, and to prohibit the rotation of said lever in the direction counter to the first direction R1, in order to keep the spring 44 tensioned.

In the preferred embodiment of the invention, the third means 24 is designed to free the immobilisation element 22 so as to release the resilient element 20, and thus the spring 44 thereof, in response to the pressure P prevailing in the surroundings of the device 10 exceeding a specified pressure threshold $P_s$.

Figure 4A:
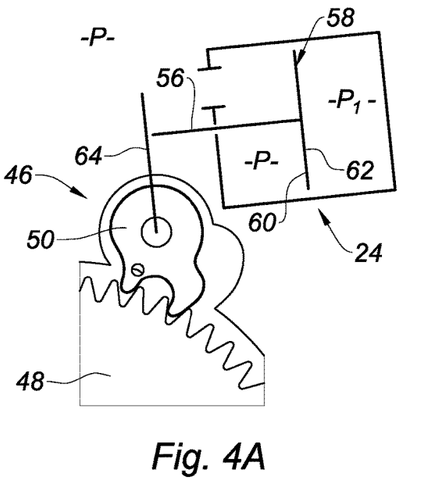
FIGS. 4A and 4B are detailed views of the second and third means of the device according to the invention in two operating positions.
Figure 4B:
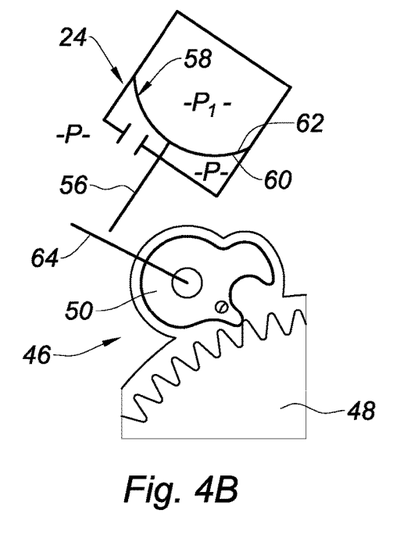

More particularly, the third means 24 is designed to raise the pawl 50 from the toothed sector 48 as soon as the ambient pressure P of the device 10 exceeds the specified pressure threshold $P_s$. For this purpose, as shown in FIGS. 4A and 4B, the third means 24 comprises at least one lifting element 56 which is designed to lift the pawl 50 out of the toothed sector 48, and a movable diaphragm 58 which is rigidly connected to said lifting element 56 and is restored resiliently to its starting position. A specified pressure P1 is applied to one surface 60 of the diaphragm 58, and an opposing surface 62 of the diaphragm 58, to which the ambient pressure P is applied, is able to move, once the specified pressure threshold $P_s$ is exceeded, in order to actuate said lifting element 56. The lifting element 56 is for example shaped in the form of a second lever 56 which is rigidly connected to the diaphragm 58 and is able to cooperate with a third lever 64 that is fixed to the pawl 50 for conjoint rotation therewith, in order to cause said pawl to rock once the ambient pressure P has exceeded the pressure threshold $P_s$, as shown in FIG. 4B.

It will therefore be understood that the second lever 56 and the third lever 64 form the mechanical connection 26 between the third means 24 and the second means 20, 22.

It will be understood that any other embodiment of the third means 24 can of course be suitable for good implementation of the invention.

Freeing the toothed sector 48 allows to cause said toothed sector 48 to rotate, and to transmit said movement to the rod 42 and to thus again transform the potential energy EP, stored by the spring 44, into mechanical energy E2. The toothed sector 48 or the rod 42 can be coupled, if necessary by means of a suitable movement transmission device, to the fourth means 28 in order to transform the mechanical energy E2 restored in this way into electrical energy EL. The coupling of the toothed sector 48 or the rod 42 to the fourth means 28 is shown schematically in FIG. 2, in the form of a toothed wheel.

Figure 5:
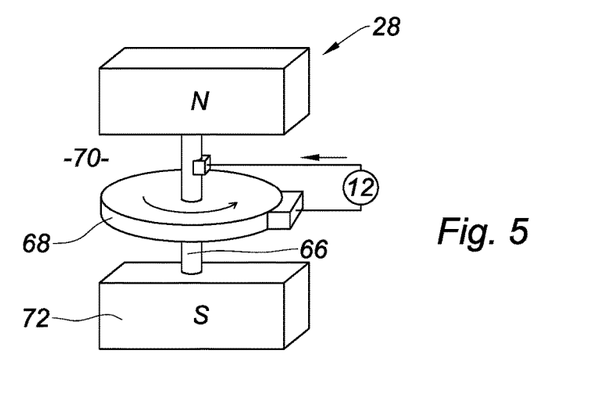
FIG. 5 is a schematic detailed view of the fourth means of the device according to the invention.

The fourth means 28 is shown in greater detail in FIG. 5, in the form of a dynamo comprising a shaft 66 that is rigidly connected to a reel 68 which is rotatably mounted in the gap 70 of a magnet 72. It will be understood that the fourth means 28 could be produced in any other form, for example as a piezoelectric device.

In this embodiment, a method for powering electrical equipment depending on the ambient pressure P applied to said equipment, said equipment comprises various steps associated with the increase or the decrease in the ambient pressure P.

In a general manner, the method thus comprises a first step, STEP1, during which a variation in the ambient pressure P applied to the device 10, i.e. a reduction or an increase in said ambient pressure P, is transformed into mechanical energy E1 that is simultaneously stored in the form of potential energy EP in the spring 44 of the resilient element 20 of the second means 20, 22. During said step STEP1, the variation in the pressure P actuates the aneroid control 16 for example, which control actuates the rod 40, which actuates the first lever 42, which in turn drives the spring 44.

A second step, STEP2, then takes place, during which the potential energy EP is conserved in the spring 44 of the second means 20, 22 as long as the ambient pressure P does not exceed a specified pressure threshold $P_s$, i.e. as long as said pressure remains lower (or higher) than said specified pressure threshold $P_s$. During said step, the resilient element 20, and in particular the spring 44 thereof, is kept tightened, under stress, by the pawl device 46.

A third step, STEP3, then takes place, during which, as soon as the ambient pressure P exceeds the specified pressure threshold Ps, the third means 24 releases the second means 20, 22 such that said second means releases the potential energy EP which is simultaneously restored in the form of mechanical energy E2 and then transformed back into electrical energy EL by the fourth means 24. Thus, during this phase, the movement of the diaphragm 58 causes the second lever 56 to be actuated and the pawl 50 to rock, which allows to release the toothed sector 48 of the pawl device 46 and to thus release the spring 44.

During said third step, STEP3, the electrical equipment 12 is thus powered using the electrical energy EL.

FIGS. 6 and 7 show two different sequences of the steps of the power supply method according to the invention, said sequences occurring during one complete flight VOL or during two successive flights VOL N, VOL N+1, respectively.

In FIG. 6, the method first comprises a step, STEP1, during which the variation in the pressure P allows to produce mechanical energy E1 and to simultaneously convert said energy into mechanical potential energy EP. This step occurs during the climbing phase, the pressure P varying for example from a pressure of approximately 1013 mbar, with minor variations depending on the altitude of the airport from where the aircraft has taken off and the climate thereof, to a pressure of approximately 300 mbar for a cruising altitude of 30,000 feet.

Step STEP2 occurs at said cruising altitude of the aircraft, during which step the potential energy EP is conserved. When the aircraft descends, the ambient pressure P increases until it exceeds a threshold Ps which, during STEP3, triggers the release of potential energy EP and, simultaneously, the transformation of said energy into restored mechanical energy E2 and then into electrical energy EL. This embodiment can be applied in particular for a sensor that is intended to be powered only during descent, for example a sensor that needs to be activated at the time of or prior to landing.

In FIG. 7, the step STEP1, during which the variation in the pressure P allows to produce mechanical energy E1 and to convert said energy into mechanical potential energy EP, occurs during the descent phase of a first flight, the ambient pressure increasing from 300 mbar to 1013 mbar for example.

Step STEP2 then occurs during a phase in which the aircraft is on the ground, during which step the potential energy EP is conserved. When the aircraft takes off again, the ambient pressure P decreases until it exceeds a threshold Ps which, during STEP3, triggers the release of potential energy EP and the restoration of mechanical energy E2 and the transformation of said energy into electrical energy EL.

This embodiment can be applied in particular for equipment that is to be powered only during ascent, for example for powering a sensor for measuring the thrust of an engine of the aircraft.

The invention can thus of course be applied to an aircraft comprising self-contained electrical equipment that is designed to be powered depending on the altitude of said aircraft, and thus allows to facilitate and limit the cabling of such an aircraft.

The invention claimed is:

1. Self-contained device for storing and releasing energy in order to power electrical equipment, characterised in that said self-contained device comprises:
   - a first means (16) that is designed to transform a variation in ambient pressure (P) applied to the device into mechanical energy (E1),
   - at least one second means that is designed to mechanically store said mechanical energy (E1) by transforming said mechanical energy (E1) into the form of mechanical potential energy (EP),
   - a third means that is designed to trigger the release of the mechanical potential energy (EP) contained in said at least one second means by transforming said mechanical potential energy (EP) into the form of restored mechanical energy (E2), as soon as the ambient pressure (P) exceeds a specified pressure threshold ($P_s$),
   - a fourth means which is designed to transform the restored mechanical energy (E2) into electrical energy (EL) that is suitable for powering said electrical equipment.

2. Self-contained device according to claim 1, wherein the first means comprises at least one resiliently returning movable diaphragm that has at least one surface to which a specified pressure ($P_o$) is applied, and an opposing surface to which said ambient pressure (P) is applied, said diaphragm being able to move in response to a variation in said ambient pressure (P) in order to produce said mechanical energy (E1) by means of the movement of said diaphragm.

3. Self-contained device according to claim 1, wherein the at least one second means comprises at least one resilient element that is capable of converting the mechanical energy (E1) into potential energy (EP) and to store said potential energy (EP), and of converting the stored potential energy (EP) into restored mechanical energy (E2), and an immobilisation element that is designed to immobilise said resilient element in a configuration in which it conserves said potential energy (EP).

4. Self-contained device according to claim 3, wherein the third means is designed to free said immobilisation element so as to release said resilient element in response to the pressure (P) of the surroundings of the device exceeding a specified pressure threshold ($P_s$).

5. Method for powering an electrical equipment comprising the self-contained device of claim 4, depending on the ambient pressure (P) applied to said equipment,
wherein said method comprises:
a first step (STEP1) during which a variation in the ambient pressure (P) applied to the device (10) is transformed into mechanical energy (E1) that is simultaneously stored in the form of potential energy (EP) in the at least one resilient element of the second means,
a second step (STEP2) that follows the first step (STEP1) and during which the potential energy (EP) is conserved in the at least one resilient element of the second means as long as the ambient pressure (P) does not exceed a specified pressure threshold (Ps),
a third step (STEP3) during which, as soon as the ambient pressure (P) exceeds said specified pressure threshold ($P_s$), the third means releases the second means such that said second means releases the potential energy (EP) which is converted into restored mechanical energy (E2) and then into electrical energy (EL) by the fourth means, and during which third step the electrical equipment is powered using the electrical energy (EL).

6. Self-contained device according to claim 3, wherein the immobilisation element comprises a pawl device having at least one toothed sector, in particular a rack that is fixed to the resilient element for movement therewith, and a pawl that is designed to engage in said toothed sector, opposing any movement of said toothed sector and of the resilient element that corresponds to a release of the potential energy (EP) stored in said resilient element.

7. Self-contained device according to claim 6, wherein the third means is designed to lift the pawl from the toothed sector in response to the pressure (P) of the surroundings of the device exceeding a specified pressure threshold ($P_s$).

8. Self-contained device according to claim 7, wherein the third means comprises at least one movable element that is designed to lift the pawl out of the toothed sector, and a resiliently returning movable diaphragm that is rigidly connected to said lifting element, that has one surface to which a specified pressure (Pi) is applied, and an opposing surface to which the ambient pressure (P) is applied, and which is able to move, as soon as the pressure (P) in the surroundings of the device exceeds a specified pressure threshold ($P_s$), in order to actuate said movable element.

9. Method for powering an electrical equipment comprising the self-contained device of claim 8, depending on the ambient pressure (P) applied to said equipment,
wherein said method comprises:
a first step (STEP1) during which a variation in the ambient pressure (P) applied to the device (10) is transformed into mechanical energy (E1) that is simultaneously stored in the form of potential energy (EP) in the at least one resilient element of the second means,
a second step (STEP2) that follows the first step (STEP1) and during which the potential energy (EP) is conserved in the at least one resilient element of the second means as long as the ambient pressure (P) does not exceed a specified pressure threshold (Ps),
a third step (STEP3) during which, as soon as the ambient pressure (P) exceeds said specified pressure threshold ($P_s$), the third means releases the second means such that said second means releases the potential energy (EP) which is converted into restored mechanical energy (E2) and then into electrical energy (EL) by the fourth means, and during which third step the electrical equipment is powered using the electrical energy (EL).

10. Method for powering an electrical equipment comprising the self-contained device of claim 7, depending on the ambient pressure (P) applied to said equipment,
wherein said method comprises:
a first step (STEP1) during which a variation in the ambient pressure (P) applied to the device (10) is transformed into mechanical energy (E1) that is simultaneously stored in the form of potential energy (EP) in the at least one resilient element of the second means,
a second step (STEP2) that follows the first step (STEP1) and during which the potential energy (EP) is conserved in the at least one resilient element of the second means as long as the ambient pressure (P) does not exceed a specified pressure threshold (Ps),
a third step (STEP3) during which, as soon as the ambient pressure (P) exceeds said specified pressure threshold ($P_s$), the third means releases the second means such that said second means releases the potential energy (EP) which is converted into restored mechanical energy (E2) and then into electrical energy (EL) by the fourth means, and during which third step the electrical equipment is powered using the electrical energy (EL).

11. Method for powering an electrical equipment comprising the self-contained device of claim 6, depending on the ambient pressure (P) applied to said equipment,
wherein said method comprises:
a first step (STEP1) during which a variation in the ambient pressure (P) applied to the device (10) is transformed into mechanical energy (E1) that is simultaneously stored in the form of potential energy (EP) in the at least one resilient element of the second means,
a second step (STEP2) that follows the first step (STEP1) and during which the potential energy (EP) is conserved in the at least one resilient element of the second means as long as the ambient pressure (P) does not exceed a specified pressure threshold (Ps),
a third step (STEP3) during which, as soon as the ambient pressure (P) exceeds said specified pressure threshold ($P_s$), the third means releases the second means such that said second means releases the potential energy (EP) which is converted into restored mechanical energy (E2) and then into electrical energy (EL) by the fourth means, and during which third step the electrical equipment is powered using the electrical energy (EL).

12. Method for powering an electrical equipment comprising the self-contained device of claim 3, depending on the ambient pressure (P) applied to said equipment, wherein said method comprises:
a first step (STEP1) during which a variation in the ambient pressure (P) applied to the device (10) is transformed into mechanical energy (E1) that is simultaneously stored in the form of potential energy (EP) in the at least one resilient element of the second means, a second step (STEP2) that follows the first step (STEP1) and during which the potential energy (EP) is conserved in the at least one resilient element of the second means as long as the ambient pressure (P) does not exceed a specified pressure threshold (Ps), a third step (STEP3) during which, as soon as the ambient pressure (P) exceeds said specified pressure threshold ($P_s$), the third means releases the second means such that said second means releases the potential energy (EP) which is converted into restored mechanical energy (E2) and then into electrical energy (EL) by the fourth means, and during which third step the electrical equipment is powered using the electrical energy (EL).

13. Self-contained device according to claim 1, wherein the fourth means comprises a dynamo.

14. Method for powering an electrical equipment comprising the self-contained device of claim 13, depending on the ambient pressure (P) applied to said equipment, wherein said method comprises:

a first step (STEP1) during which a variation in the ambient pressure (P) applied to the device (10) is transformed into mechanical energy (E1) that is simultaneously stored in the form of potential energy (EP) in the at least one resilient element of the second means, a second step (STEP2) that follows the first step (STEP1) and during which the potential energy (EP) is conserved in the at least one resilient element of the second means as long as the ambient pressure (P) does not exceed a specified pressure threshold (Ps), a third step (STEP3) during which, as soon as the ambient pressure (P) exceeds said specified pressure threshold ($P_s$), the third means releases the second means such that said second means releases the potential energy (EP) which is converted into restored mechanical energy (E2) and then into electrical energy (EL) by the fourth means, and during which third step the electrical equipment is powered using the electrical energy (EL).

15. Aircraft comprising self-contained electrical equipment that is designed to be powered depending on the altitude of said aircraft, characterised in that said aircraft comprises at least one of the device according to claim 1 for powering the electrical equipment, an ambient pressure (P) of the aircraft being applied to said device.

* * * * *